(12) United States Patent
Mochizuki et al.

(10) Patent No.: US 11,105,661 B2
(45) Date of Patent: Aug. 31, 2021

(54) LIGHT EMITTING POINTER DEVICE

(71) Applicant: Yazaki Corporation, Tokyo (JP)

(72) Inventors: Yasufumi Mochizuki, Makinohara (JP);
Terukazu Kuboyama, Shimada (JP);
Ami Shibahara, Shimada (JP); Takuya Ishizawa, Shimada (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/913,023

(22) Filed: Jun. 26, 2020

(65) Prior Publication Data

US 2021/0033433 A1 Feb. 4, 2021

(30) Foreign Application Priority Data

Jul. 31, 2019 (JP) .............................. JP2019-140964

(51) Int. Cl.
*G01D 11/28* (2006.01)
*B60K 37/02* (2006.01)

(52) U.S. Cl.
CPC .............. *G01D 11/28* (2013.01); *B60K 37/02* (2013.01); *B60K 2370/336* (2019.05); *B60K 2370/341* (2019.05)

(58) Field of Classification Search
CPC .. G01D 11/28; B60K 37/02; B60K 2370/336; B60K 2370/341

USPC ............................................ 362/23.01, 23.21
See application file for complete search history.

(56) References Cited

U.S. PATENT DOCUMENTS

| | | | | |
|---|---|---|---|---|
| 2002/0108555 | A1* | 8/2002 | Breinich | B60K 37/02 116/288 |
| 2014/0078713 | A1* | 3/2014 | Maebashi | G01D 13/04 362/23.21 |

FOREIGN PATENT DOCUMENTS

JP 2013-88351 A 5/2013

* cited by examiner

*Primary Examiner* — Rajarshi Chakraborty
*Assistant Examiner* — Hana S Featherly
(74) *Attorney, Agent, or Firm* — Sughrue Mion, PLLC

(57) ABSTRACT

A light emitting pointer device which can reduce luminance unevenness at a light emitting face is provided. An annular rib is provided between a first holding portion holding an emission shaft and a second holding portion holding a light entrance shaft and the annular rib thereby covers a corner of the light entrance shaft. As a result, the light is not likely to enter a pointer body from the corner of the light entrance shaft, thereby reducing stray light and reducing luminance unevenness. An upper face of the annular rib on the light entrance shaft side has a radius of curvature that is greater than a radius of curvature of the corner of the light entrance shaft and is tapered, thus the corner can be easily covered with a space between the light entrance shaft and the annular rib.

2 Claims, 6 Drawing Sheets

LIGHT EMITTING POINTER DEVICE

TECHNICAL FIELD

The present invention relates to a light emitting pointer device.

BACKGROUND

Conventionally, there has been proposed a meter device that is provided with a light source, a pointer having a light guiding property and a dial plate, and that is configured such that light from the light source that has entered the pointer is totally reflected inside the pointer and is emitted from a surface (a light emitting face) of the pointer (for example, refer to Patent Document 1). In the meter device described in Patent Document 1, a light control part which is a trapezoidal through hole is formed on the pointer, and the light entering the pointer from a rotation shaft is reflected by side face portions of the light control part and is directed toward a tip end side of the pointer.

PRIOR ART DOCUMENT

Patent Document
  Patent Document 1: JP 2013-88351 A

SUMMARY OF THE INVENTION

Problem to be Solved

In the meter device described in Patent Document 1, the rotation shaft of a movement is fitted into a fit recess of the pointer to rotate the pointer. However, the configuration in which the rotation shaft is fitted into the fit recess has a drawback that the light is refracted at a boundary face between the rotation shaft and the fit recess and stray light is likely to be produced, causing luminance unevenness at the light emitting face.

To address this, it is possible to configure such that the rotation shaft of the movement and the shaft of the pointer are held together in a coaxial fashion, with an end face of the rotation shaft of the movement facing an end face of the shaft of the pointer. In this configuration, the light emitted from the end face of the rotation shaft of the movement is incident on the end face of the shaft of the pointer. However, light may be incident also on a corner (i.e., an outer periphery of the end face) of the shaft of the pointer, and such incident light may travel in an unintended direction and may become stray light.

In view of the above-described drawback, an object of the present invention is to provide a light emitting pointer device which can reduce luminance unevenness at a light emitting face.

Solution to Problem

In order to achieve the above-described object, the present invention provides, in one aspect, a light emitting pointer device including: a light source; a light guide member that is configured to guide light emitted from the light source and that includes an emission shaft; a pointer body; and a holding member, wherein the pointer body includes: a light entrance shaft arranged coaxially with respect to the emission shaft; a main pointer portion extending to a first side in an intersecting direction intersecting the light entrance shaft; a sub-pointer portion extending to a second side in the intersecting direction; a light emitting face formed on faces of the main pointer portion and the sub-pointer portion opposite to the light entrance shaft; and a light control space formed between the light entrance shaft and the light emitting face, wherein the holding member includes: a first holding portion holding the emission shaft; a second holding portion holding the light entrance shaft; and an annular rib formed between the first holding portion and the second holding portion and configured to cover a corner of the light entrance shaft, a face of the annular rib on the light entrance shaft side having a radius of curvature that is greater than a radius of curvature of the corner of the light entrance shaft and is tapered.

Advantageous Effect of the Invention

According to the light emitting pointer device of the present invention described above, the annular rib is provided between the first holding portion holding the emission shaft and the second holding portion holding the light entrance shaft and the annular rib thereby covers the corner of the light entrance shaft. As a result, the light is not likely to enter the pointer body from the corner of the light entrance shaft, thereby reducing stray light and reducing luminance unevenness. In addition, the face of the annular rib on the light entrance shaft side has a radius of curvature that is greater than a radius of curvature of the corner of the light entrance shaft and is tapered, thus the corner can be easily covered. Especially, when arranging the light entrance shaft and the annular rib with a space therebetween, it is easier to cover the corner compared to when the face of the annular rib on the light entrance shaft side is a flat face.

DETAILED DESCRIPTION OF THE EXEMPLARY EMBODIMENTS

Figure 1:
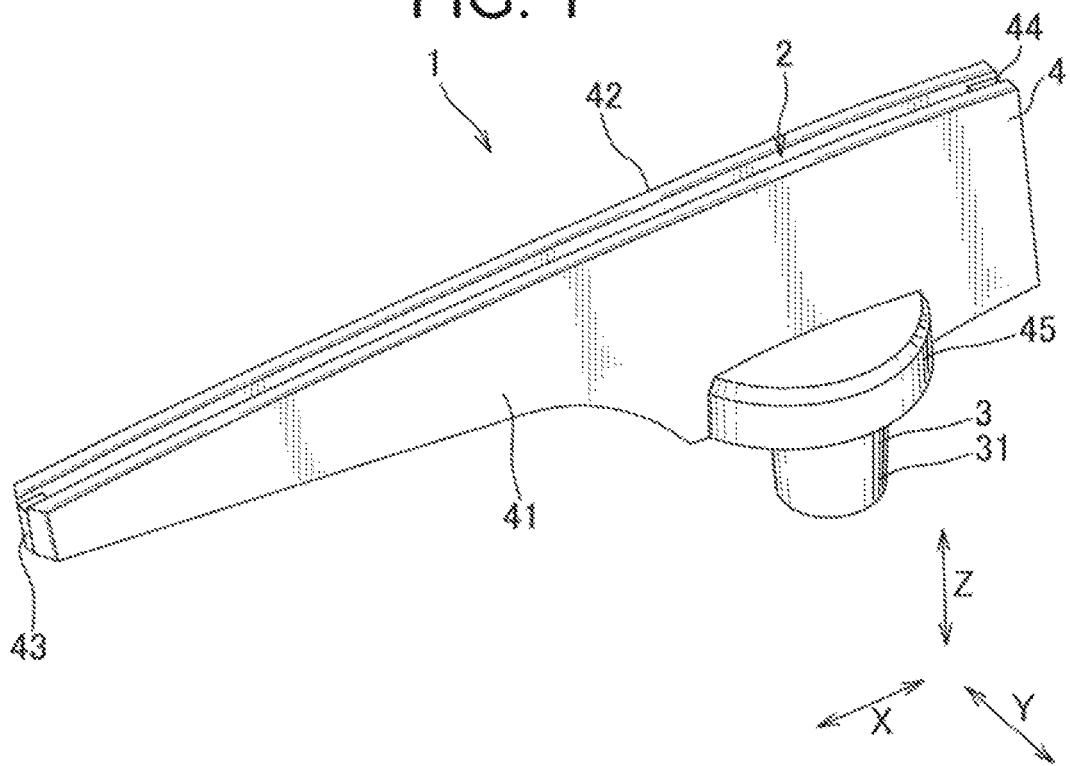
FIG. 1 is a perspective view showing a light emitting pointer device according to one embodiment of the present invention.

In the following, each embodiment of the present invention will be explained with reference to the drawings. As shown in FIG. 1 to FIG. 5, a light emitting pointer device 1 of this embodiment is provided with a pointer body (light guide pointer) 2, a base 3 as a holding member, a cap 4, a balance 5, a light source 6 and a light guide member 7, and is used in a vehicle display device (e.g., a speedometer) for pointing letters, numbers or the like. In this embodiment, a direction of a rotation shaft of the pointer body 2 is referred to as a Z direction, an extending direction of the pointer body 2 is referred to as an X direction, and a direction substantially orthogonal to both of the X direction and the Z direction is referred to as a Y direction. Further, in the Z direction, a side that is viewed by a user is referred to as an upper side, and a side opposite thereto is referred to as a lower side, and these can be merely expressed as upward and downward, respectively.

Figure 2:
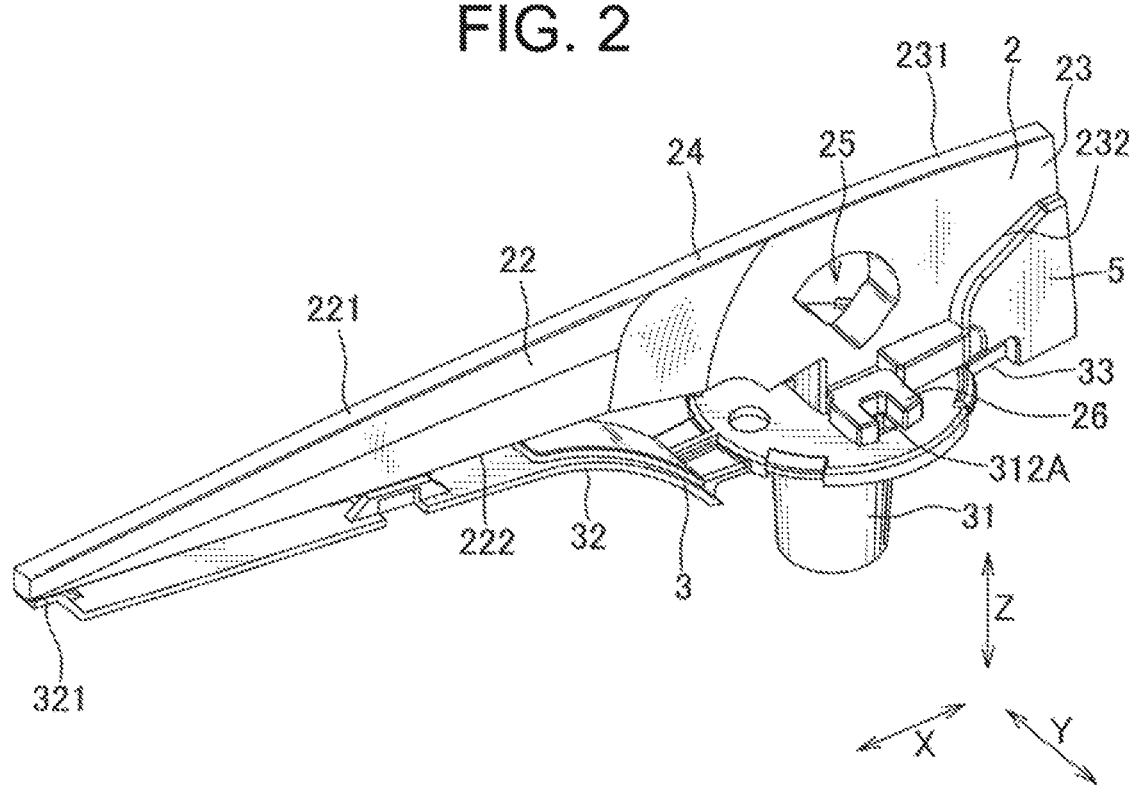
FIG. 2 is a perspective view showing the light emitting pointer device with a cap being removed.
Figure 3:
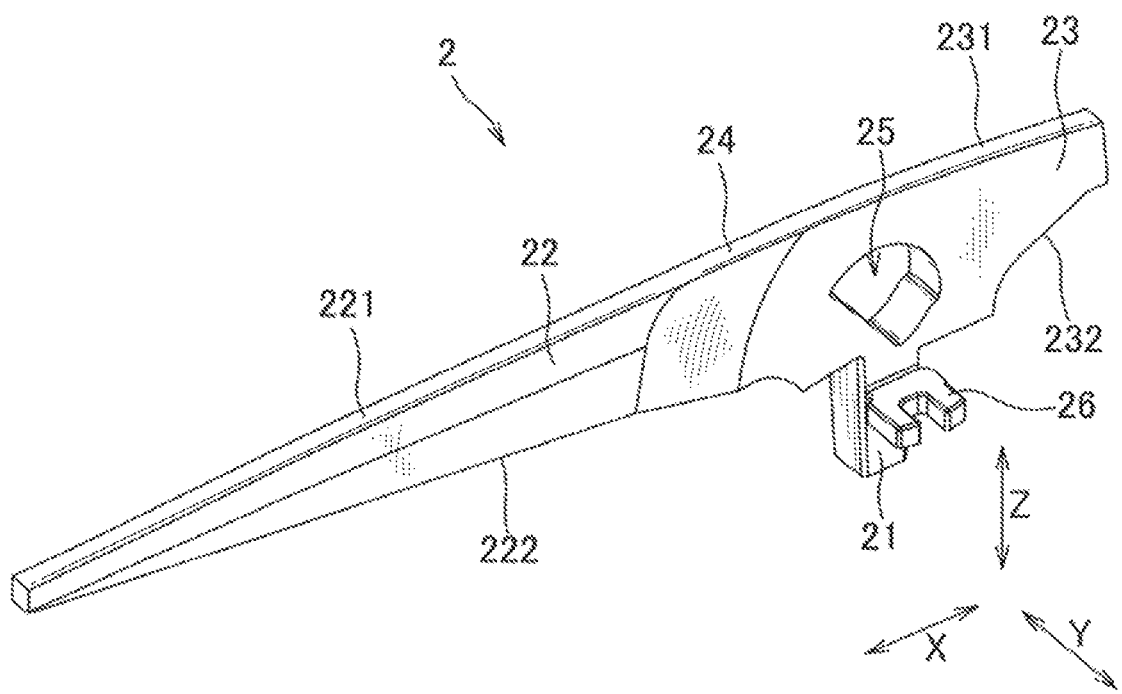
FIG. 3 is a perspective view showing a light guide pointer of the light emitting pointer device.
Figure 4:
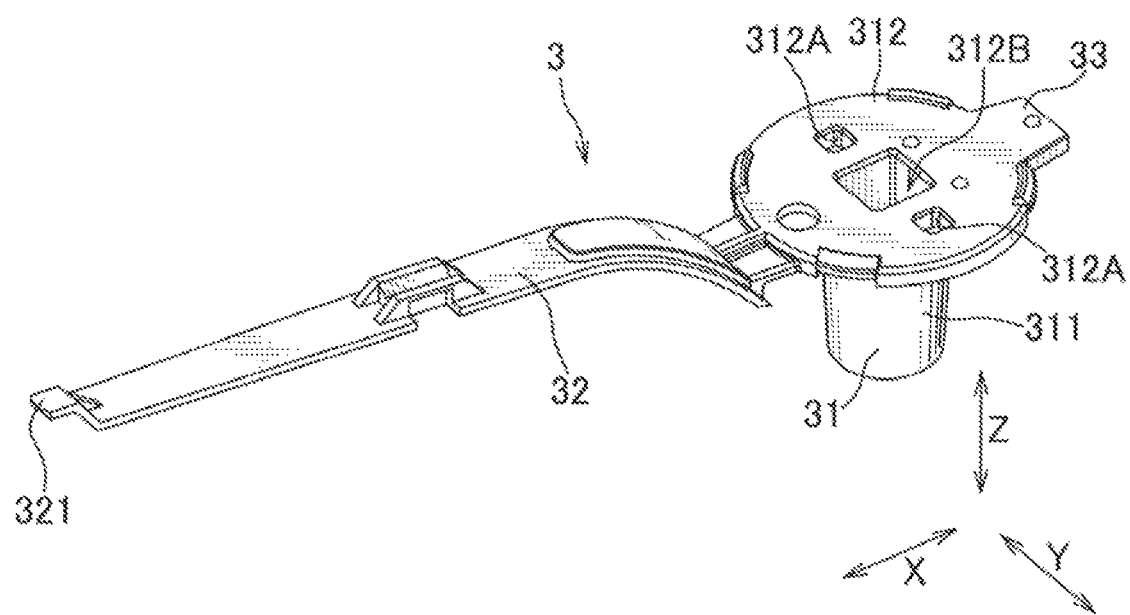
FIG. 4 is a perspective view showing a base of the light emitting pointer device.
Figure 5:
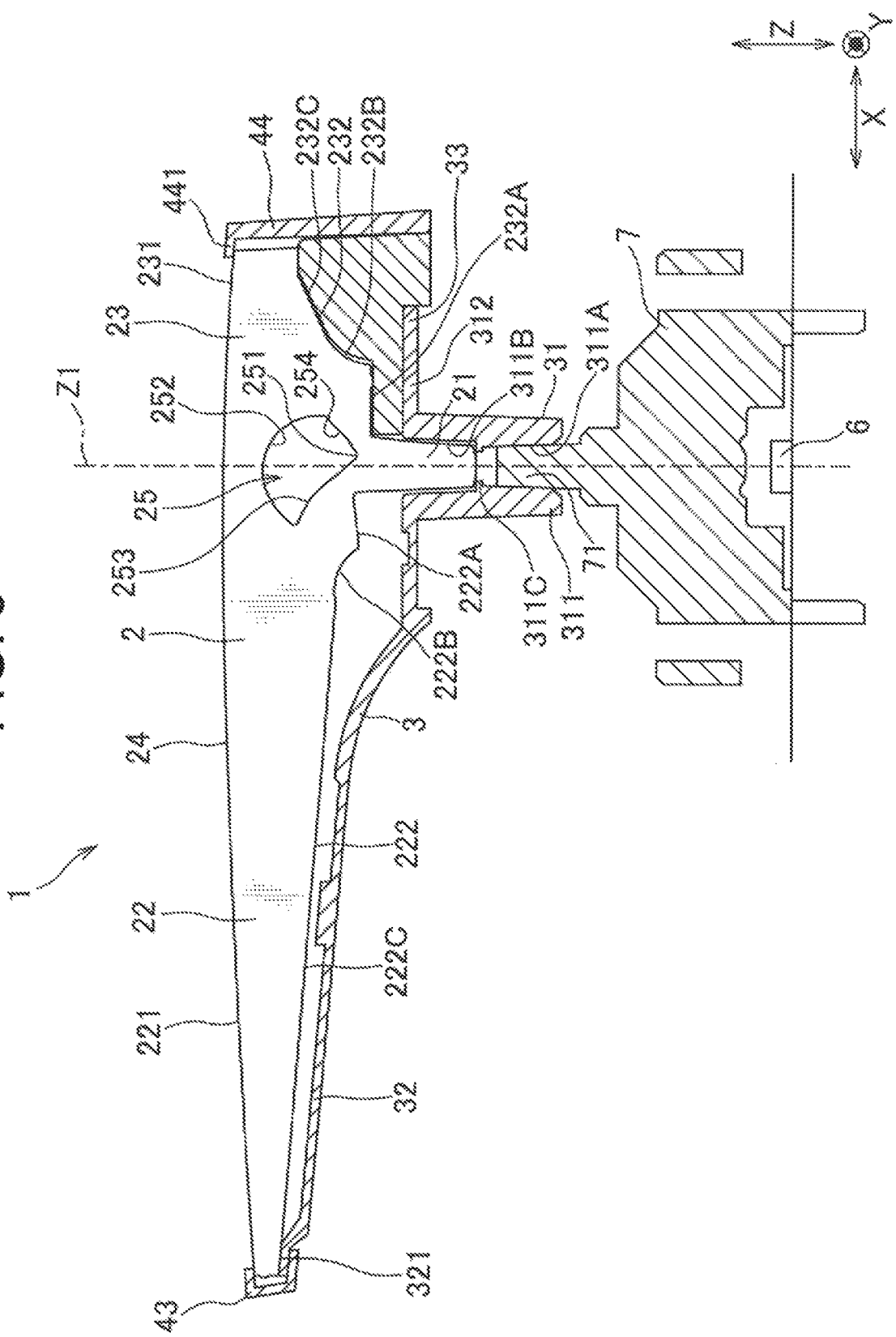
FIG. 5 is a cross-sectional view showing the light emitting pointer device.

The pointer body 2 is made of a transparent light guiding resin such as acrylic resin, for example, and, as shown in FIG. 2, FIG. 3 and FIG. 5, it integrally includes a light entrance shaft 21, a main pointer portion 22, a sub-pointer portion 23, a light emitting face 24, a light control space 25 and a to-be-fixed portion 26.

The light entrance shaft 21 is a portion for guiding light emitted from the light source 6 to enter into the pointer body 2 and is a portion that constitutes a rotation shaft of the pointer body 2, and is formed into a quadrangular prism shape having a square cross section. A side face of the quadrangular prism-shaped pointer body 2 is preferably a flat face, however it may have some curvature (e.g., curvature of R40 or more).

The main pointer portion 22 extends from an upper end of the light entrance shaft 21 to one side in the X direction and is formed into a plate-like shape defining a plate thickness direction in the Y direction. The main pointer portion 22 is used to point to letters, numbers or the like with its tip end. An upper face 221 of the main pointer portion 22 constitutes a portion of the light emitting face 24. A lower face 222 of the main pointer portion 22 includes, in sequence from the light entrance shaft 21 side to the tip end side of the main pointer portion 22, a separating face 222A, a recessed portion 222B and an approaching face 222C.

The separating face 222A extends toward the lower side in the Z direction (i.e., the side away from the upper face 221) as approaching to the tip end side. The approaching face 222C extends toward the upper side in the Z direction (i.e., the upper face 221 side) as approaching to the tip end side. The recessed portion 222B is a curved face portion that is formed recessed with respect to an imaginary extended surface of the approaching face 222C when viewed from the lower side in the Z direction (i.e., protruding toward the upper side in the Z direction). An inner face of the recessed portion 222B (i.e., a face on the inner side of the pointer body 2) corresponds to a secondary reflection face that is formed recessed on the light entrance shaft 21 side with respect to the approaching face 222C as an inclined face. As such, the entire main pointer portion 22 has a tapered shape when viewed from the Y direction.

The sub-pointer portion 23 extends from the upper end of the light entrance shaft 21 toward the other side in the X direction and is formed into a plate-like shape defining the plate thickness direction in the Y direction. An entire length (i.e., the X direction dimension) of the sub-pointer portion 23 is shorter than the main pointer portion 22. An upper face 231 of the sub-pointer portion 23 constitutes other part of the light emitting face 24. A lower face 232 of the sub-pointer portion 23 includes, in sequence from the light entrance shaft 21 side to a tip end side of the sub-pointer portion 23, a flat face 232A, an approaching curved face 232B and an approaching flat face 232C.

The flat face 232A extends along the X-Y plane. The approaching flat face 232C extends toward the upper side in the Z direction as approaching to the tip end side. The approaching curved face 232B extends toward the upper side in the Z direction (i.e., the upper face 231 side) as approaching to the tip end side, and is formed recessed when viewed from the lower side in the Z direction (i.e., protruding upward in the Z direction). An inner face of the approaching curved face 232B (i.e., a face on the inner side of the pointer body 2) corresponds to a secondary reflection face that is formed recessed on the light entrance shaft 21 side with respect to the approaching flat face 232C as an inclined face. As such, the sub-pointer portion 23 has a tapered shape when viewed from the Y direction.

The light emitting face 24 is constituted of the upper face 221 of the main pointer portion 22 and the upper face 231 of the sub-pointer portion 23, and extends along the X-Y plane.

Figure 6:
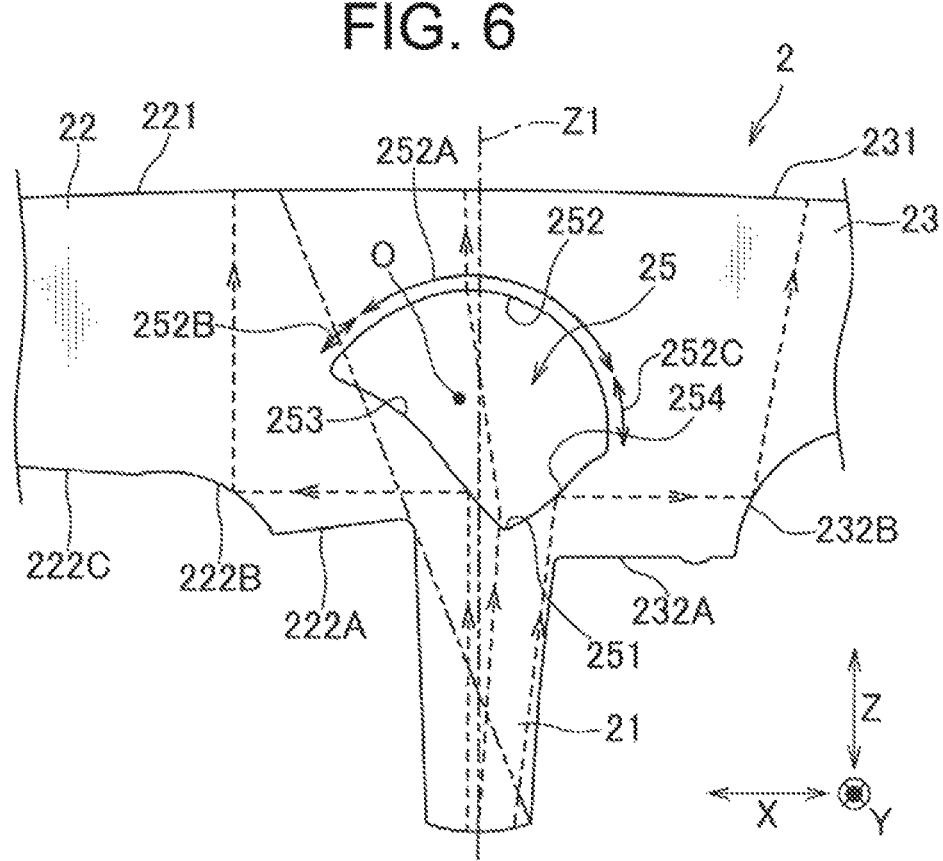
FIG. 6 is a side view showing a part of the light guide pointer.

Above the light entrance shaft 21 in the Z direction, the light control space 25 is formed by a through hole that penetrates, in the Y direction, through the plate-shaped pointer body 2. As also shown in FIG. 6, the light control space 25 is surrounded by a vertex portion 251, a circular arc portion 252, a front inclined portion 253 and a rear inclined portion 254, and is formed into a substantially sector (or fan)-like shape when viewed from the Y direction. Inside the light control space 25, no light control piece or the like is disposed but an air layer is formed.

The vertex portion 251 is located on the other side (i.e., on the sub-pointer portion 23 side) in the X direction with respect to a center axis Z1 of the light entrance shaft 21. Herein, the center axis Z1 of the light entrance shaft 21 is an axis which passes through an intersection of diagonal lines of the square that is a cross section of the light entrance shaft 21, and which extends in the Z direction.

The circular arc portion 252 is located on the upper side in the Z direction with respect to the vertex portion 251 and is formed protruding upward in the Z direction, such that a center O of the circular arc portion 252 is located on the one side (i.e., on the main pointer portion 22 side) in the X direction with respect to the center axis Z1. Further, the circular arc portion 252 includes a central circular arc 252A through which the center axis Z1 passes, and a pair of side circular arcs 252B, 252C formed on both sides in the X direction of the central circular arc 252A and having a radius greater than that of the central circular arc 252A. Herein, the center O of the circular arc portion 252 is a center of the central circular arc 252A.

The side circular arcs 252B, 252C are smoothly connected to the central circular arc 252A and have a common tangent plane at the connecting points. Thus, a center of the side circular arc 252B is located on the lower side in the Z direction or the other side in the X direction with respect to the center O of the central circular arc 252A, and a center of the side circular arc 252C is located on the lower side in the Z direction or the one side in the X direction with respect to the center O of the central circular arc 252A. In addition, the radii of the side circular arcs 252B, 252C are preferably 1.3 or less times the radius of the central circular arc 252A.

The front inclined portion 253 is an inclined face that connects the vertex portion 251 and an end of the side circular arc 252B on the one side in the X direction and that extends toward the upper side in the Z direction as approaching toward the one side in the X direction. In this embodiment, the front inclined portion 253 is formed into a curved face that is protruding upward in the Z direction, however it may be a flat face. The connecting portion connecting the front inclined portion 253 and the side circular arc 252B is located on the one side in the X direction with respect to a plane (indicated in FIG. 6 by a two-dot chain line) that passes through an end of the light entrance shaft 21 located at a lower end of the light entrance shaft 21 and located on the other side in the X direction and that also passes through the connecting portion connecting the light entrance shaft 21 and the separating face 222A.

The rear inclined portion 254 connects the vertex portion 251 and an end of the side circular arc 252C on the other side in the X direction, and is an inclined face extending toward the upper side in the Z direction as approaching toward the other side in the X direction. In this embodiment, the rear inclined portion 254 is a curved face protruding upward in the Z direction, however it may be a flat face.

The to-be-fixed portion 26 projects from the light entrance shaft 21 to both sides in the Y direction and is formed into a U-like shape when viewed from the Z direction. When molding the pointer body 2 using a die, the to-be-fixed portion 26 can be formed by opening the die in the Y direction since the to-be-fixed portion 26 has the U-like shape. At this time, inside the U-like shape of the to-be-fixed portion 26, a chamfered edge face or a rounded edge face can be formed easily on the upper and lower faces in the Z direction. This can prevent an edge of the to-be-fixed portion 26 from being scraped off when press fitting a fixation member such as a pin into the U-like shape and can prevent formation of foreign objects such as shavings.

Figure 7:
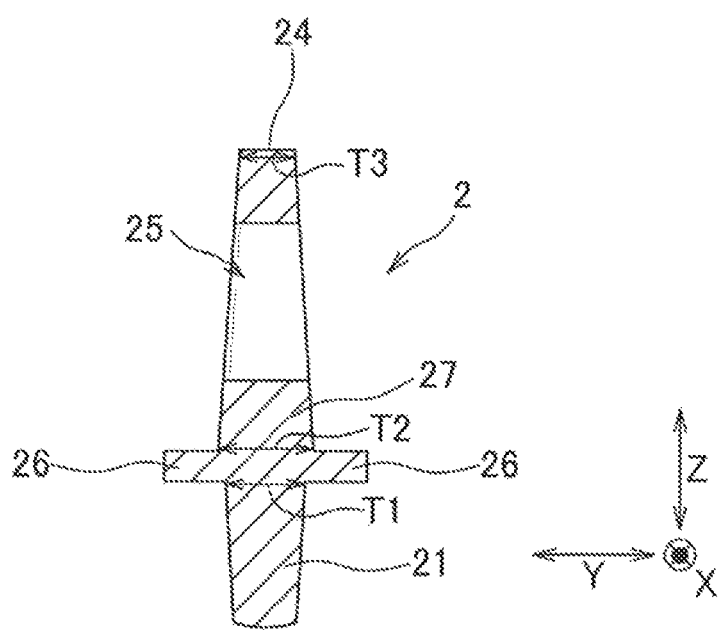
FIG. 7 is a cross-sectional view showing a light entrance shaft and a light control space of the light guide pointer.

As shown in FIG. 7 which shows a cross section taken along a line passing through the light control space 25, the pointer body 2 has a Y direction dimension (i.e., a plate thickness dimension) T1 at an upper end of the light entrance shaft 21 (i.e., a boundary with the to-be-fixed portion 26) that is smaller than a Y direction dimension T2 at a boundary between the to-be-fixed portion 26 and an upper portion 27 thereof. This can prevent the light that has passed through the light entrance shaft 21 from being emitted from an upper face of the to-be-fixed portion 26 to outside the pointer body 2. Further, the Y direction dimension T2 of the upper portion 27 is greater than a Y direction dimension T3 of the light emitting face 24. Further, it is preferable that a boundary between the upper portion 27 and the to-be-fixed portion 26 is not formed into a curved face but is cornered portion.

The base 3 is made of opaque resin and integrally includes a connecting portion 31 for connecting the pointer body 2 and the light guide member 7, a cover portion 32 covering a lower face 222 of the main pointer portion 22 and a support portion 33 for supporting the balance 5 at the sub-pointer portion 23 side.

The connecting portion 31 includes a tubular portion 311 extending in the Z direction and a circular plate portion 312 connected to an upper end of the tubular portion 311. The tubular portion 311 includes a circular tube-shaped first holding portion 311A holding a later-described emission shaft 71 of the light guide member 7, a quadrangular tube-shaped second holding portion 311B into which the light entrance shaft 21 is inserted, and an annular rib 311C formed on an inner face between the first holding portion 311A and the second holding portion 311B. That is, the tubular portion 311 has different inner circumferential shapes for upper and lower sides in the Z direction of the annular rib 311C as a boundary. Herein, the annular rib 311C may be formed into a circular ring-like shape according to a shape of the first holding portion 311A, or may be formed into an angled ring-like shape according to a shape of the second holding portion 311B.

Figure 8:
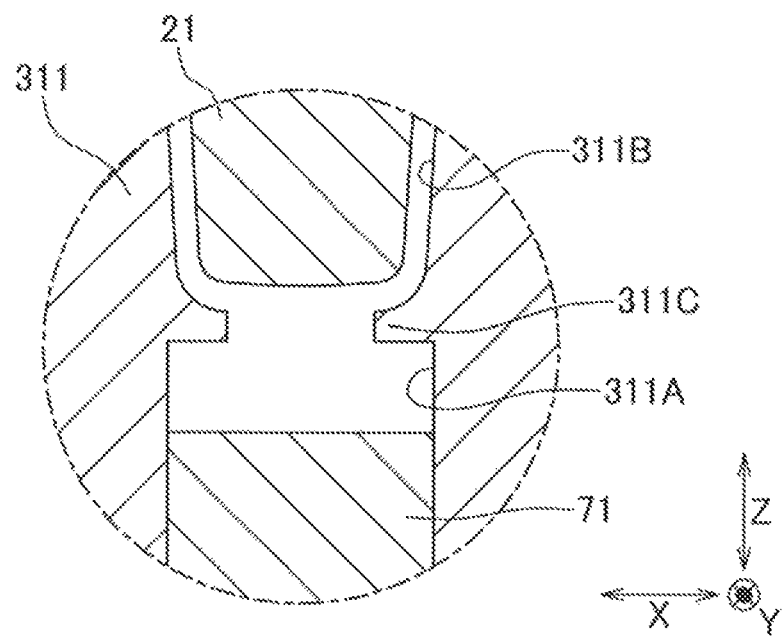
FIG. 8 is a cross-sectional view showing a part of the base.

As shown in FIG. 8, the annular rib 311C covers a corner of the light entrance shaft 21. That is, when viewed from the lower side in the Z direction, the corner of the light entrance shaft 21 is hidden by the annular rib 311C. Herein, the corner of the light entrance shaft 21 refers to an outer periphery of the lower end face in the Z direction of the light entrance shaft 21. Further, an upper face of the annular rib 311C has a radius of curvature that is greater than that of the corner of the light entrance shaft 21 and is tapered. A gap is formed between the upper face of the annular rib 311C and the lower end of the light entrance shaft 21, thus the upper face of the annular rib 311C and the lower end of the light entrance shaft 21 do not contact each other. The lower face of the annular rib 311C is a flat face lying in the XY plane.

The circular plate portion 312 includes to-be-fixed holes 312A on both sides in the Y direction of the second holding portion 311B. The to-be-fixed portion 26 of the pointer body 2 is placed onto the to-be-fixed holes 312A, and a fixture member such as a pin is inserted into the to-be-fixed hole 312A. By doing so, the pointer body 2 is fixed to the base 3.

The cover portion 32 is formed into a strip plate-like shape so as to follow the lower face 222 of the main pointer portion 22 and has a connecting portion 321 at its tip end for connection with the cap 4.

The support portion 33 is formed into a plate-like shape lying in the XY plane and is arranged with a space from the lower face 232 of the sub-pointer portion 23.

The cap 4 is made of opaque resin and includes a pair of side face portions 41, 42 sandwiching the pointer body 2 in the Y direction, a tip end portion 43 connecting the pair of side face portions 41, 42 on the one side in the X direction and covering the tip end of the main pointer portion 22, a rear end wall portion 44 connecting the pair of side face portions 41, 42 on the one side in the X direction, and a circular portion 45 covering the circular plate portion 312 of the base 3, such that the cap 4 covers the pointer body 2.

The pair of side face portions 41, 42 is arranged separate from each other at an upper edge in the Z direction so as to form a gap, and the light emitting face 24 of the pointer body 2 is visible through this gap. Further, the pair of side face portions 41, 42 is arranged separate from each other at a lower edge in the Z direction so as to form a gap, and, a part of this gap located on the one side in the X direction with respect to the circular portion 45 is covered by the cover portion 32. At this time, the tip end of the cover portion 32 is engaged to the tip end portion 43 of the cap 4. That is, the tip end portion 43 is sandwiched between the tip end portion 43 and the lower face 222 of the pointer body 2.

Figure 9:
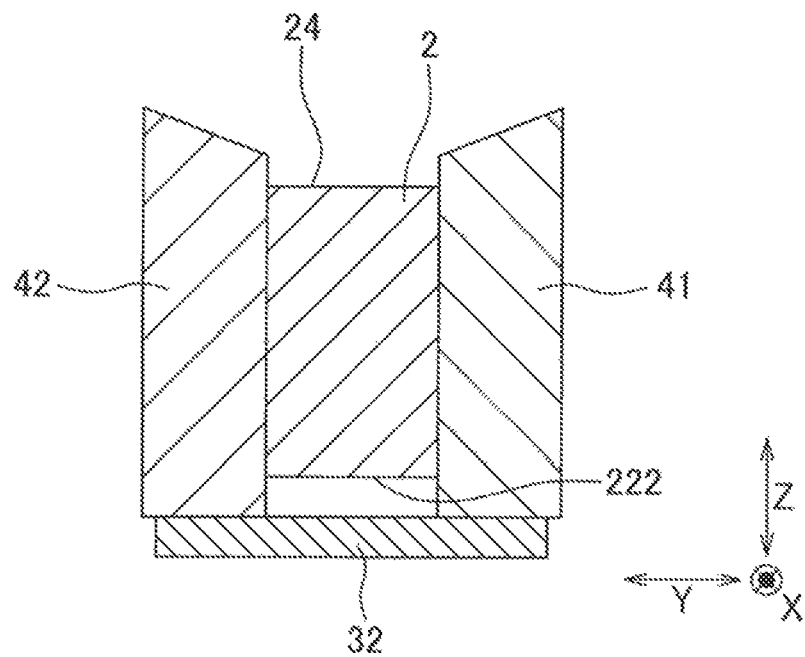
FIG. 9 is a cross-sectional view showing a tip end portion of the light emitting pointer device.

As shown in FIG. 9, the Y direction dimension of the gap formed between the lower edges in the Z direction of the pair of side face portions 41, 42 is smaller than the Y direction dimension of the cover portion 32, and the cover portion 32 and the side face portions 41, 42 have overlapping portions in the Z direction. Thus, the light emitted from the lower face 222 of the pointer body 2 is prevented from leaking out from the cap 4 and the base 3.

Figure 10:
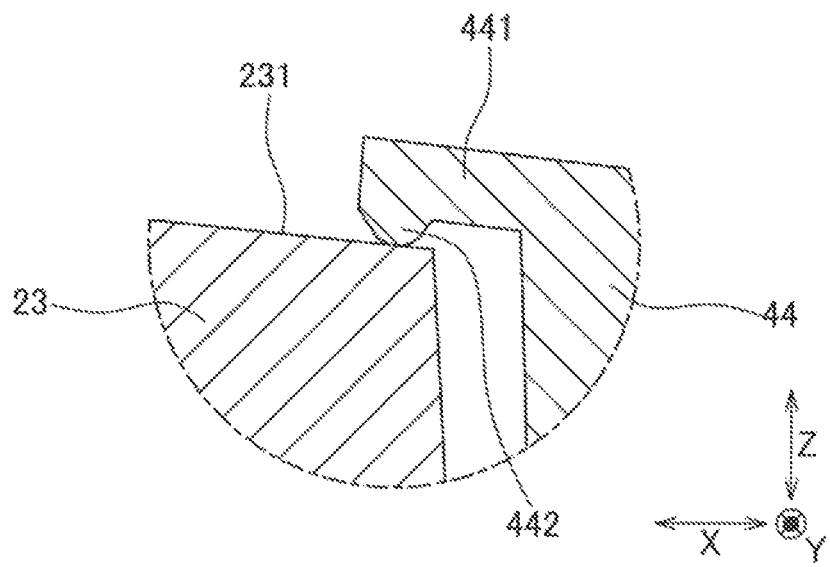
FIG. 10 is a cross-sectional view showing a part of the cap.

As shown in FIG. 10, the rear end wall portion 44 includes a retaining portion 441 projecting from its upper end in the Z direction toward the one side in the X direction, and a protruding portion 442 is formed on the lower face of the retaining portion 441. The protruding portion 442 contacts in a point contact fashion with an end on the other side in the X direction of the upper face 231 of the pointer body 2.

The circular portion 45 covers from the side the circular plate portion 312 and the to-be-fixed portion 26 with the circular tube-shaped portion, and covers from above the circular plate portion 312 and the to-be-fixed portion 26 with a pair of semi-circular plate portions.

The balance 5 is a weight provided to position a center of gravity of a rotating unit constituted of the pointer body 2, the base 3 and the cap 4, on the center axis Z1. The balance 5 is arranged at a location sandwiched by the sub-pointer portion 23 and the circular plate portion 312 in the Z direction. An upper face of the balance 5 has a shape that follows the lower face 232 of the sub-pointer portion 23, and a part of a lower face of the balance 5 is disposed on the circular plate portion 312. Since the rear end wall portion 44 includes the retaining portion 441 as described above, the pointer body 2 and the balance 5 are sandwiched by and the base 3 and the cap 4 and retained.

With the balance 5 being sandwiched indirectly by the base 3 and the cap 4 via the pointer body 2 in a manner as described above, an area of the upper face 231 of the sub-pointer portion 23 exposed from the cap 4 is increased compared to the configuration in which the balance 5 is directly sandwiched, thereby improving the design appearance. Further, with the protruding portion 442 of the retaining portion 441 being in point contact with the upper face 231, the pointer body 2 can be prevented from being applied with excessive load.

The light source 6 is constituted of a LED, for example, and it is located on the center axis Z1 at the lower side in the Z direction of the rotating unit including the pointer body 2 and emits light.

The light guide member 7 is provided so as to cover the light source 6 from above in the Z direction and includes a columnar emission shaft 71 arranged coaxially with respect to the light entrance shaft 21. A drive means drives and rotates the entire light guide member 7 around the center axis Z1, and this rotation is transmitted to the rotating unit including the pointer body 2.

The following will explain in detail about traveling of the light in the light emitting pointer device 1 as described above. Firstly, the light emitted from the light source 6 and traveling upward in the Z direction is emitted from the upper end face of the emission shaft 71 and enters to the lower end face of the light entrance shaft 21. At this time, the light is condensed by the annular rib 311C. The light that has entered from the lower end face of the light entrance shaft 21 into the pointer body 2 travels upward within the light entrance shaft 21 and reaches to the light control space 25.

The light that has reached to the front inclined portion 253 is mostly totally reflected, thereby travels toward the one side in the X direction. The light that has reached to the rear inclined portion 254 is mostly totally reflected, thereby travels toward the other side in the X direction. At this time, since the vertex portion 251 is located on the other side in the X direction with respect to the center axis Z1, the percentage of the light that reaches to the front inclined portion 253 of the total light traveling within the light entrance shaft 21 in high, thus the light is more distributed to the main pointer portion 22 side. Herein, the front inclined portion 253 and the rear inclined portion 254 have the inclination angle that is likely to cause the total reflection (e.g., 45±10° with respect to the center axis Z1) in accordance with the refractive index of the resin member constituting the pointer body 2.

The light that has not been totally reflected by the front inclined portion 253 and the rear inclined portion 254 and has entered the light control space 25 is diffused and attenuated in the air layer in the light control space 25 and reaches to the circular arc portion 252. The light that has reached to the circular arc portion 252 returns into the pointer body 2 while being refracted and is emitted from the light emitting face 24.

At the vertex portion 251, total reflection hardly occurs and thus more light enters the light control space 25. That is, among the light that enters the light control space 25, the light that passes through the vertex portion 251 has the highest intensity. The light that has entered the light control space 25 from the vertex portion 251 travels inside the light control space 25 so as to travel toward the one side in the X direction due to refraction, reaches to the circular arc portion 252 and returns into the pointer body 2 while being refracted, and is emitted from the light emitting face 24 (shown in FIG. 6 with a dotted line).

Figure 11:
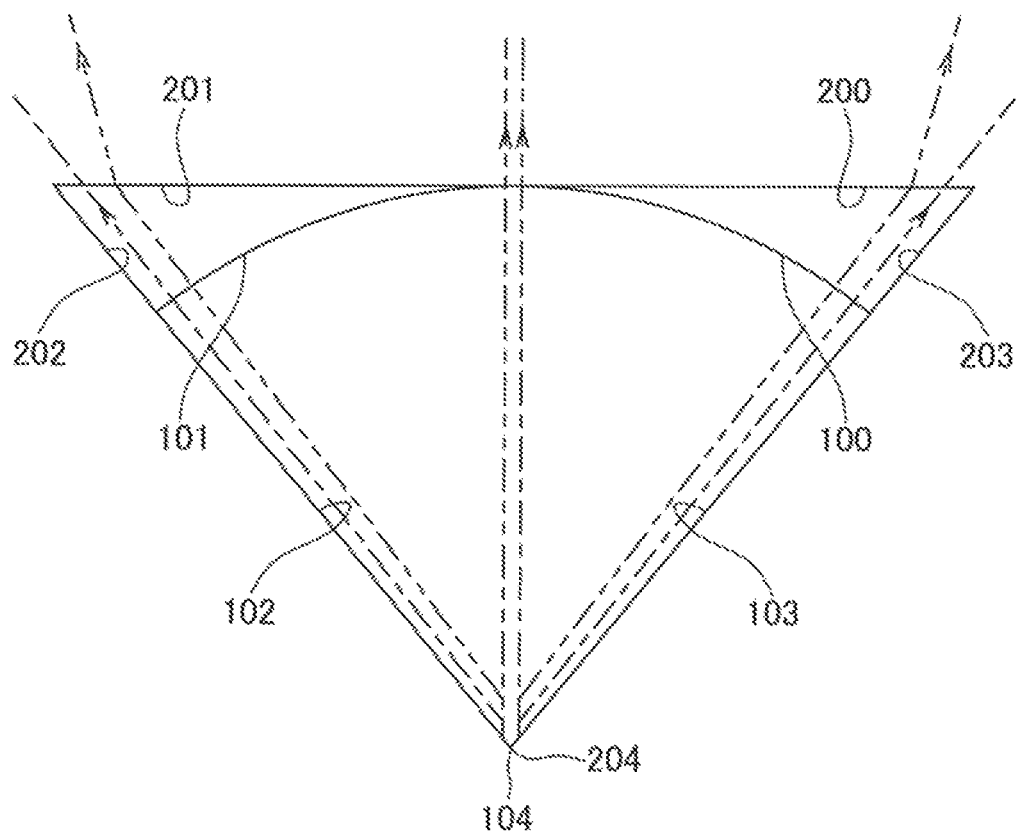
FIG. 11 is a side view schematically showing a path of light passing through the light guide pointer.

Now, referring to the schematic diagram shown in FIG. 11, a light control space 100 in which the upper face is formed not a circular arc shape is compared with a light control space 200 in which the upper face is formed into a flat face. Although the light control space 25 of this embodiment does not have a perfect sector shape, FIG. 11 compares the sector-shaped light control space 100 and the isosceles triangle-shaped light control space 200 for the convenience of explanation.

Provided that a circular arc portion 101 of the light control space 100 contacts a bottom side 201 of the isosceles triangle of the light control space 200, inclined portions 102, 103 of the light control space 100 are shorter than inclined portions 202, 203 of the light control space 200.

Further, the light that passes through a vertex 104 (i.e., a center of the circular arc portion 101) of the light control space 100 travels to the direction orthogonal to the circular arc portion 101, thus it does not change its traveling direction when it is emitted from the circular arc portion 101. On the other hand, for the light that passes through a vertex 204 of the light control space 200, the traveling direction is inclined with respect to the bottom side 201, thus it is refracted when being emitted from the bottom side 201 and its traveling direction is changed inwardly. Consequently, the light that is emitted from the circular arc portion 101 of the light control space 100 travels in a wider range than the light that is emitted from the bottom side 201 of the light control space 200.

The light that has totally reflected by the front inclined portion 253 heads toward the tip end of the main pointer portion 22 while being totally reflected by the upper face 221 and the lower face 222 of the main pointer portion 22. The light that is not totally reflected is emitted from the upper face 221 or the lower face 222. At this time, since the lower face 222 includes the recessed portion 222B, the light that has been totally reflected by the front inclined portion 253 is likely to reach to the recessed portion 222B (shown in FIG. 6 with a dotted line). The light that has been totally reflected by the recessed portion 222B as the secondary reflection face travels upward in the Z direction and is likely to be emitted from the upper face 221 in the vicinity of the circular arc portion 252 and on the one side in the X direction.

The light that has been totally reflected by the rear inclined portion 254 heads toward the tip end of the sub-pointer portion 23 while being totally reflected by the upper face 231 and the lower face 232 of the sub-pointer portion 23. The light that is not totally reflected is emitted from the upper face 231 or the lower face 232. At this time, since the lower face 232 includes the approaching curved face 232B, the light that has been totally reflected by the rear inclined portion 254 is likely to reach to the approaching curved face 232B (shown in FIG. 6 with a dotted line). The light that has been totally reflected by the approaching curved face 232B as the secondary reflection face travels upward in the Z direction and is likely to be emitted from the upper face 231 in the vicinity of the circular arc portion 252 and on the other side in the X direction.

As such, the light is emitted from the light emitting face 24 that includes the upper face 221, 231 as described above, and this light passes through the gap between the upper edges in the Z direction of the pair of side face portion 41, 42 and is viewed by a user.

According to this embodiment, the following advantageous effects can be provided. That is, since the vertex portion 251 of the light control space 25 is located on the sub-pointer portion 23 side with respect to the center axis Z1 of the light entrance shaft 21, the light is more guided into the longer main pointer portion 22, thereby providing an appropriate balance between luminance at the main pointer portion 22 and luminance at the sub-pointer portion 23. Further, since the light control space 25 includes the circular arc portion 252, the range of diffusion of the light that has passed through the light control space 25 can be broadened. Further, the length of the inclined portions 253, 254 can be decreased, thereby preventing the attenuation of the light traveling along the inclined portions 253, 254.

In addition, since the center O of the circular arc portion 252 is located on the main pointer portion 22 side with respect to the center axis Z1, the strong light that has entered into the light control space 25 from the vertex portion 251 can be diffused more. Consequently, it is possible to prevent local focusing and/or attenuation of the light, while providing an appropriate balance between luminance on the main pointer portion 22 side and luminance on the sub-pointer portion 23 side, thereby reducing the luminance unevenness at the light emitting face 24.

In addition, since the circular arc portion 252 includes the central circular arc 252A and the pair of side circular arcs 252B, 252C each having a radius that is greater than a radius of the central circular arc 252A, the light is more diffused at the central circular arc 252A while the degree of diffusion of light is reduced at the side circular arcs 252B, 252C. Consequently, strong light that has entered the light control space 25 from the vertex portion 251 can be diffused at the central circular arc 252A, thereby providing balanced luminance.

Further, since the light entrance shaft 21 is formed to have a square cross section, focusing of light can be prevented even when the light traveling in the light entrance shaft 21 along the Z direction is reflected by the side faces, thereby reducing luminance unevenness. That is, if the light entrance shaft is formed into a cylindrical shape, then the light reflected by the side face is likely to be focused at a focal point at a center of a circle, but the light entrance shaft 21 having a square cross section can prevent such focusing of the light.

Further, since the annular rib 311C is provided between the first holding portion 311A that holds the emission shaft 71 and the second holding portion 311B that holds the light entrance shaft 21 so as to cover the corner of the light entrance shaft 21, the light hardly enters the pointer body 2 from the corner of the light entrance shaft 21, hence stray light can be reduced and luminance unevenness can be reduced. Further, since the upper face of the annular rib 311C on the light entrance shaft 21 side has a radius of curvature that is greater than that of the corner of the light entrance shaft 21 and is tapered, the corner can be easily covered with a space between the light entrance shaft 21 and the annular rib 311C.

Further, since the main pointer portion 22 and the sub-pointer portion 23 include the recessed portion 222B and the approaching curved face 232B as the secondary reflection faces at the lower faces 222, 232, respectively, it is possible ensure luminance at a portion of the light emitting face 24 that encompasses the light control space 25 from the X direction, thereby reducing luminance unevenness. That is, at a region of the light emitting face 24 located above the light control space 25 in the Z direction, the light that has passed through the light control space 25 is emitted and thereby luminance is ensured, and at a region of the light emitting face 24 located distance from the light control space 25, the light that travels inside the main pointer portion 22 or the sub-pointer portion 23 while being totally reflected is emitted and thereby luminance is ensured, and further, at a portion of the light emitting face 24 that encompasses the light control space 25 from the X direction, where luminance typically tends to be reduced, it is possible to compensate for luminance by making the light reflected by the secondary reflection faces and thereby making the light travel upward in the Z direction.

Further, since the lower face 222 of the main pointer portion 22 includes the separating face 222A that extends away from the light emitting face 24, the light that has been reflected by the front inclined portion 253 of the light control space 25, that is not likely to travel downward in the Z direction, is not likely to reach to the corner which is a boundary between the separating face 222A and the recessed portion 222B. Consequently, the light is not likely to be reflected by the corner between the separating face 222A and the recessed portion 222B, thereby preventing luminance to be partially high at the light emitting face 24, thereby reducing luminance unevenness.

The present invention is not limited to the embodiment described above, and it may include other configurations and such that can achieve the object of the present invention, including modifications and such as described below.

For example, in the embodiment described above, the lower faces 222, 232 of the main pointer portion 22 and the sub-pointer portion 23 include the recessed secondary reflection faces located on the light entrance shaft 21 side with respect to the inclined faces; however, the location at which the recessed reflection face is formed is not limited to the light entrance shaft side with respect to the inclined face. When there is a region on the light emitting face at which luminance is likely to be locally reduced, the recessed reflection face may be formed at an appropriate location to reflect the light toward this region. In addition, it is not necessary to form the secondary reflection face on the lower face when the local luminance reduction on the light emitting face is not likely to occur.

Preferred configurations, techniques and such for implementing the present invention have been disclosed; however, the present invention is not limited to these. That is, although the present invention has been specifically shown and described mainly with respect to specific embodiments, a person skilled in the art can make various modifications to those embodiments described above in terms of shape, material, number and/or other detailed configurations without departing from the scope of technical idea and an object of the present invention. Description that may limit the shape, material and such disclosed herein is used for the illustrative purpose only to enhance understanding of the present invention and is not intended to limit the present invention. Therefore, description using name of a member without such limitation, either entire limitation or a part of limitation, regarding the shape, material and such, is also within the present invention.

LIST OF REFERENCE SIGNS

1 light emitting pointer device
2 pointer body
21 light entrance shaft 22 main pointer portion
222 lower face
222B recessed portion (secondary reflection face)
222C approaching face (inclined face)
23 sub-pointer portion
232 lower face
232B approaching curved face (secondary reflection face)
232C approaching flat face (inclined face)
24 light emitting face
25 light control space
251 vertex portion
253 front inclined portion
254 rear inclined portion
3 base (holding member)
311A first holding portion
311B second holding portion
311C annular rib
6 light source
7 light guide member
71 emission shaft

What is claimed is:

1. A light emitting pointer device comprising:
a light source;
a light guide member that is configured to guide light emitted from the light source and that includes an emission shaft;
a pointer body; and
a holding member,
wherein the pointer body includes:
a light entrance shaft arranged coaxially with respect to the emission shaft;
a main pointer portion extending to a first side in an intersecting direction intersecting the light entrance shaft;
a sub-pointer portion extending to a second side in the intersecting direction;
a light emitting face formed on faces of the main pointer portion and the sub-pointer portion opposite to the light entrance shaft; and
a light control space formed between the light entrance shaft and the light emitting face,
wherein the holding member includes:
a first holding portion holding the emission shaft;
a second holding portion holding the light entrance shaft; and
an annular rib formed between the first holding portion and the second holding portion and configured to cover a corner of the light entrance shaft, a face of the annular rib on the light entrance shaft side having a radius of curvature that is greater than a radius of curvature of the corner of the light entrance shaft and is tapered.

2. The light emitting pointer device according to claim 1, wherein the light control space includes:
a vertex portion; and
a pair of inclined portions extending from the vertex portion toward the light emitting face side and extending toward respective tip ends of the main pointer portion and the sub-pointer portion,
wherein each of the main pointer portion and the sub-pointer portion includes an upper face constituting the light emitting face and a lower face facing opposite to the light emitting face, and
wherein the lower face includes:
an inclined face extending toward the upper face as approaching to the tip ends; and
a secondary reflection face formed recessed and located on the light entrance shaft side with respect to the inclined face, the secondary reflection face being thereby capable of reflecting light that has been reflected by the inclined portions.

* * * * *